(12) United States Patent
Ishida

(10) Patent No.: US 12,120,110 B2
(45) Date of Patent: Oct. 15, 2024

(54) DATA RECORDING DEVICE AND METHOD

(71) Applicant: NEC Corporation, Tokyo (JP)

(72) Inventor: Katsuhiko Ishida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 280 days.

(21) Appl. No.: 17/763,768

(22) PCT Filed: Jul. 27, 2020

(86) PCT No.: PCT/JP2020/028651
§ 371 (c)(1),
(2) Date: Mar. 25, 2022

(87) PCT Pub. No.: WO2021/075121
PCT Pub. Date: Apr. 22, 2021

(65) Prior Publication Data
US 2022/0337585 A1    Oct. 20, 2022

(30) Foreign Application Priority Data

Oct. 16, 2019 (JP) ................. 2019-189562

(51) Int. Cl.
*H04L 9/40* (2022.01)
(52) U.S. Cl.
CPC ........ *H04L 63/0861* (2013.01); *H04L 63/083* (2013.01)
(58) Field of Classification Search
CPC ................ H04L 63/0861; H04L 63/083
See application file for complete search history.

(56) References Cited

U.S. PATENT DOCUMENTS

| 2016/0078430 | A1* | 3/2016 | Douglas | G06Q 30/0185 |
| | | | | 705/43 |
| 2019/0132131 | A1* | 5/2019 | Clements | H04L 9/3239 |
| 2020/0026906 | A1* | 1/2020 | Ajiki | G01C 3/06 |
| 2020/0242717 | A1* | 7/2020 | Agarwal | G06F 16/28 |
| 2021/0118072 | A1 | 4/2021 | Liu | |

(Continued)

FOREIGN PATENT DOCUMENTS

| CN | 109993667 A | | 7/2019 | |
| EP | 3789951 A1 * | | 3/2021 | G06Q 10/02 |
| JP | 2002-197365 A | | 7/2002 | |

(Continued)

OTHER PUBLICATIONS

Extended European Search Report for EP Application No. EP20877171.7 dated on Oct. 13, 2022.

(Continued)

*Primary Examiner* — Harris C Wang
(74) *Attorney, Agent, or Firm* — Sughrue Mion, PLLC

(57) ABSTRACT

A block generation unit 13 generates, in a predetermined case, a block including an ID of a user in a blockchain. The block generation unit 13 generates a new block including information indicating a service provider and service contents, when face data of the user and the service contents are received from a terminal of the service provider and face authentication is successful based on the face data and face authentication data, or when the ID of the user and the service contents are received from the terminal of the service provider, and adds the new block to the blockchain.

9 Claims, 9 Drawing Sheets

(56) References Cited

U.S. PATENT DOCUMENTS

2021/0279736 A1* 9/2021 Sun ................ G06Q 20/40975
2022/0337585 A1* 10/2022 Ishida .................. G06Q 50/14

FOREIGN PATENT DOCUMENTS

| JP | 6504639 B | 4/2019 |
| JP | 2019-079577 A | 5/2019 |

OTHER PUBLICATIONS

Ahmad Nazrul M et al: "Improving Identity Management of Cloud-Based IoT Applications Using Blockchain", 2018 International Conference on Intelligent and Advanced System (ICIAS), IEEE, Aug. 13, 2018 (Aug. 13, 2018).

International Search Report for PCT Application No. PCT/JP2020/028651, mailed on Oct. 13, 2020.

English translation of Written opinion for PCT Application No. PCT/JP2020/028651, mailed on Oct. 13, 2020.

Tis, "Participates in next-generation personal authentication demonstration experiment at the graduate school of the University of Tokyo and applies blockchain technology to the construction of authentication information database", Jun. 6, 2016, [searched on Oct. 6, 2020], URL: <https://www.tis.co.jp/documents/jp/news/tis_news/20160606_1.pdf>, pp. 1-3.

Oomamyuuda Takashi, "Smartphone usage history as ID/password, The University of Tokyo and other lifestyle authentication", experiments started, Nikkei Computer, 206.0707, No. 916, pp. 12.

Tsukahara Takashi, "NEC Technical Journal, Non-daily space experience project collocation using biometrics", Mar. 5, 2019, vol. 71, No. 2, ISSN 0285-4139, pp. 55-58.

Office Action for JP Application No. 2021-552108, mailed on May 23, 2023 with English Translation.

Koji Maekawa, "Be with Hand Bulla about Nanki Shirahama During Summer. Reason in which Face Authentication Got into Stride is", Sankei Shimbun, Jul. 16, 2019.

Bittimes, "Block Chain 'Tourist Industry' How it changes ?", [online], Apr. 18, 2019, [Reiwa 5 May 15, 2023 search], and Internet <URL:https://web.archive.org/web/20190418140403/https : //bittimes. net/news /39244.html>.

* cited by examiner

FIG. 3

| | SERVICE PROVIDER INFORMATION | RESTRICTED SHARED INFORMATION | SHARED INFORMATION | FACE AUTHENTICATION INFORMATION |
|---|---|---|---|---|
| | | | ID | |
| 1 | TRAVEL AGENCY A | | | HAVING GENERATED FACE AUTHENTICATION DATA |
| 2 | HOTEL B | SERVICE CONTENTS | VISITED | SUCCESSFUL |
| 3 | RESTAURANT D | SERVICE CONTENTS | VISITED | |
| 4 | UNMANNED MUSEUM E | SERVICE CONTENTS | VISITED | SUCCESSFUL |
| 5 | HOTEL B | SERVICE CONTENTS | VISITED | SUCCESSFUL |

DATA RECORDING DEVICE AND METHOD

This application is a National Stage Entry of PCT/JP2020/028651 filed on Jul. 27, 2020, which claims priority from Japanese Patent application 2019-189562 filed on Oct. 16, 2019, the contents of all of which are incorporated herein by reference, in their entirety.

TECHNICAL FIELD

The present invention relates to a data recording device, a data recording method, and a computer readable recording medium in which a data recording program is recorded, in particular, it relates to a data recording device, a data recording method, and a computer readable recording medium that records a trend of a user receiving service provision.

BACKGROUND ART

Blockchain is known as a technology for recording information. Blockchain is described, for example, in PTL 1 and PTL 2.

Also, PTL 2 describes identity verification by face authentication.

In addition, PTL 3 describes generating incentive information of points or compensation corresponding to browsing request access from customers, and managing this information.

CITATION LIST

Patent Literature

PTL 1: Japanese Patent Application Laid-Open No. 2019-79577
PTL 2: Japanese Patent No. 6504639
PTL 3: Japanese Patent Application Laid-Open No. 2002-197365

SUMMARY OF INVENTION

Technical Problem

It is conceivable to create a plan for service provision. Multiple service providers who provide services participate in the plan.

In addition, users who apply to use the plan will receive services from at least some of the multiple service providers who participate in the plan.

When creating a better plan for users and service providers, it is desirable to be able to accurately grasp a trend of individual users receiving service provision.

Therefore, it is an object of the present invention to provide a data recording device, a data recording method, and a computer readable recording medium in which a data recording program is recorded, which can accurately grasp a trend of a user receiving service provision.

Solution to Problem

A data recording device according to the present invention includes a user management unit which generates an ID and a password of a user when information indicating application of the user for a plan related to service provision, and face data of the user are received from a predetermined terminal, transmits the ID and the password to a terminal of the user, and stores face authentication data based on the face data and the ID in association in a storage device, and a block generation unit which generates, in a predetermined case, a block including the ID in a blockchain, wherein, the block generation unit generates a new block including information indicating a service provider and service contents, when the face data of the user and the service contents are received from a terminal of the service provider and face authentication is successful based on the face data and the face authentication data, or when the ID of the user and the service contents are received from the terminal of the service provider, and adds the new block to the blockchain.

A data recording method according to the present invention is implemented by a computer, and includes generating an ID and a password of a user when information indicating application of the user for a plan related to service provision, and face data of the user are received from a predetermined terminal, transmitting the ID and the password to a terminal of the user, and storing face authentication data based on the face data and the ID in association in a storage device, generating, in a predetermined case, a block including the ID in a blockchain, and generating a new block including information indicating a service provider and service contents, when the face data of the user and the service contents are received from a terminal of the service provider and face authentication is successful based on the face data and the face authentication data, or when the ID of the user and the service contents are received from the terminal of the service provider, and adding the new block to the blockchain.

A computer readable recording medium according to the present invention is a computer readable recording medium in which a data recording program is recorded, the data recording program causes a computer to execute a user management process of generating an ID and a password of a user when information indicating application of the user for a plan related to service provision, and face data of the user are received from a predetermined terminal, transmitting the ID and the password to a terminal of the user, and storing face authentication data based on the face data and the ID in association in a storage device, a block generation process of generating, in a predetermined case, a block including the ID in a blockchain, and a block addition process of generating a new block including information indicating a service provider and service contents, when the face data of the user and the service contents are received from a terminal of the service provider and face authentication is successful based on the face data and the face authentication data, or when the ID of the user and the service contents are received from the terminal of the service provider, and adding the new block to the blockchain.

Advantageous Effects of Invention

According to the present invention, it is possible to accurately grasp a trend of a user receiving service provision.

BRIEF DESCRIPTION OF DRAWINGS

FIG. 3 It depicts a schematic diagram showing an example of a blockchain generated for a single user.

DESCRIPTION OF EMBODIMENTS

Figure 1:
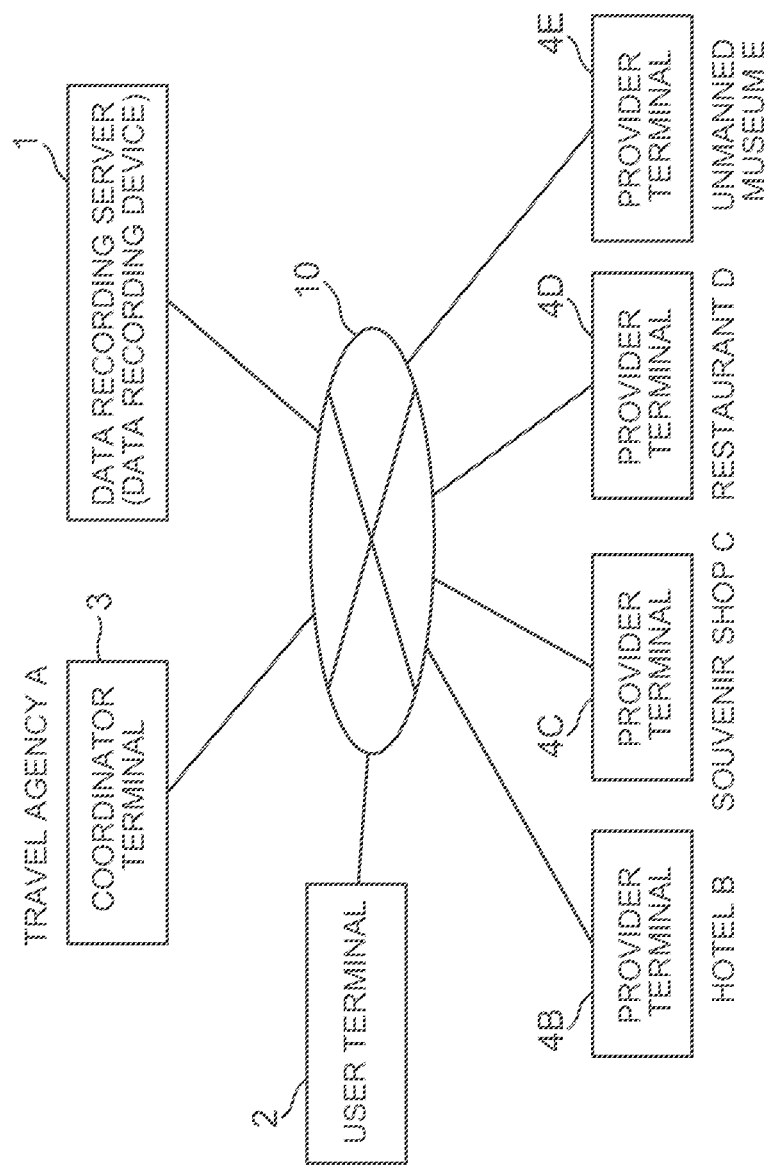
FIG. 1 It depicts a schematic diagram showing a data recording server, a user terminal, a coordinator terminal, and multiple provider terminals.

Hereinafter, an example embodiment of the present invention is described with reference to the drawings. The example embodiment is described on the case where the data recording device of the present invention is a server, and the data recording device of the present invention is referred to as a data recording server.

In the following description, it is assumed that a coordinator of the plan creates a plan for service provision. In the following description, a plan related to travel to a certain region will be used as an example of a plan related to service provision. In this plan, among service providers who provide services in the region, the service providers who wish to participate in the plan participate. The region may be a large area including multiple prefectures, for example, or a small area such as a single city and the like. In addition, multiple service providers are assumed to participate in the plan. In this example, the service providers include, but are not limited to, hotels, restaurants, souvenir shops, and unmanned museums.

In this example, it is assumed that a travel agency is a coordinator of the plan and the travel agency creates the plan.

The terminal owned by the coordinator is referred to as a coordinator terminal.

Plans are not limited to the plan related to travel. For example, a plan may be a plan for education, a plan for medical care, and so on. Depending on the plan, the type of service provider and the type of coordinator may vary.

A user who uses a plan receives services from various service providers participating in the plan. Finally, the user performs a procedure for paying a lump-sum fee to a predetermined service provider, and the predetermined service provider distributes the fees to the service providers of each service used by the user. Hereinafter, this predetermined service provider may be referred to as a payment base. The method by which the payment base distributes the fees to the service providers of each service used by the user is not particularly limited.

In the present invention, when a user who has applied to use a plan receives a service from a service provider participating in the plan, a block in the blockchain is generated, including information indicating the service provider and the service contents.

In order to guarantee that the user who has applied to use the plan has received the service, the invention uses face authentication and ID (IDentification) issued individually to the user.

In the following, for simplicity of description, the case where each user applies to use the plan alone will be described as an example. The case where multiple users apply to use the plan as a group (for example, when a family applies to use the plan) will be described later.

When a user applies to use a plan, the face data of the user is sent to the data recording server (the data recording device of the present invention). The portable terminal of the user (for example, smartphone, etc.; hereinafter, referred to as "user terminal") receives the ID and password generated by the data recording server. The user terminal has a predetermined application software for plan use (hereinafter, referred to as "application for plan use") installed in advance. The user terminal displays the ID according to the application for plan use. For example, if a user inputs the ID and password received from the data recording server to the user terminal, and the ID and password are successfully authenticated, the user terminal displays the ID in a predetermined mode. As an example of the display mode of the ID, for example, display by a two-dimensional bar code and the like can be mentioned, but the display mode is not limited to this display mode.

Face data is data from which facial feature data can be extracted, and an example of face data is a face image obtained from a camera shot. The following description is based on the case where the face data (data from which facial feature data can be extracted) is a face image. However, face data is not limited to a face image, and any data that can be extracted by a method that can identify the target person or object and has the same level of accuracy as information obtained from face images can be used as face data.

Each service provider has its own terminal including a camera for acquiring face data or a reading device for reading the user's ID. Hereinafter, the terminal owned by the service provider is referred to as a provider terminal.

When a user visits a service provider and receives a service from the service provider, the provider terminal transmits information indicating the service provider, information indicating the fact that the user has visited, and the service contents, along with face data or ID, to the data recording server. The service contents are the service provided to the user and the price of the service. For example, information such as "hamburger, 500 yen" corresponds to the service contents.

The data recording server generates a block, in a blockchain, including information indicating the service provider, information indicating the fact that the user has visited, and the service contents, when the face authentication of the user using the face data is successful or when the service contents, etc. are received together with the ID generated for the user. In addition, if the face authentication is successful, the data recording server will also include information indicating that fact in the block.

When the service provider's facility is an unmanned facility (for example, an unmanned museum, etc.), the unmanned facility has two separate entrances, one for the plan users described above and one for general users who purchase tickets and enter the facility. A sensor and a camera are installed at the entrance for the plan users, and when the sensor detects a visitor, the camera takes a picture of the visitor's face, and the provider terminal of the unmanned facility transmits the information indicating the service provider, the information indicating the fact that the user has visited, the service contents, and the face data to the data recording server. In addition, since the general user is not a plan user, the provider terminal does not do anything when the general user enters the entrance for general users.

If the service provider's facility is a manned facility such as a restaurant, for example, a camera installed in the provider terminal of that manned facility may takes a picture the face of the user. Alternatively, a reading device installed in the provider terminal of that manned facility may read the ID of the user displayed on the user terminal. When the camera takes a picture of the user's face, the provider terminal of the manned facility transmits information indicating the service provider, information indicating the fact that the user has visited, service contents, and face data to the data recording server. When the reading device reads the ID of the user, the provider terminal of the manned facility transmits the information indicating the service provider, the information indicating the fact that the user has visited, the service contents, and the ID to the data recording server.

Thus, each time a user who has applied to use the plan receives a service from a service provider participating in the plan, a block of the blockchain is added.

In addition, the blockchain is generated separately for each user who has applied to use the plan. For example, if there are X users who have applied to use a plan created by a travel agency, X blockchains will be generated separately. As mentioned above, for the sake of simplicity, the case where each user applies to use the plan alone is taken as an example.

FIG. 1 is a schematic diagram showing a data recording server (data recording device), a user terminal, a coordinator terminal, and multiple provider terminals. In the following, a case where hotel B, souvenir shop C, restaurant D, and unmanned museum E participate as service providers in a travel plan created by a travel agency A (coordinator) will be described as an example. However, the service providers participating in the plan are not limited to the above example, and the number of service providers participating in the plan is also not limited. Further, it is assumed the hotel B is the payment base.

As shown in FIG. 1, a data recording server 1, a user terminal 2, a coordinator terminal 3, and provider terminals 4B to 4E are communicably connected through a communication network 10.

The travel agency A owns the coordinator terminal 3.

The hotel B owns the provider terminal 4B. Similarly, the souvenir shop C, restaurant D, and unmanned museum E have the provider terminal 4C, provider terminal 4D, and provider terminal 4E, respectively. In the following, when each provider terminal 4B to 4E is not particularly distinguished, it is simply referred to as the provider terminal 4.

The coordinator terminal 3 is installed, for example, at a store of the travel agency A. When a user comes to the store of the travel agency A to apply for a plan, the coordinator terminal 3 takes a picture of the user's face with a camera installed in the coordinator terminal 3 according to the operator's operation, and generates face data. In addition, the address (for example, e-mail address) of the user terminal used by the user is input to the coordinator terminal 3 by the operator. Then, the coordinator terminal 3 transmits the information indicating the user's application to the plan for service provision, the face data of the user, and the address to the data recording server 1.

When the data recording server 1 receives the information indicating the user's application to the plan, face data and address (address of the user terminal), it generates face authentication data, ID and password for that user. The face authentication data is the data for performing face authentication. In the face authentication, success is determined when the facial feature data matches. The received face data itself may be used as the face authentication data, or the facial feature data extracted from the received face data may be used as the face authentication data.

The data recording server 1 stores the ID and password generated for the user who has applied for the plan use in association with the face authentication data. In addition, the data recording server 1 transmits the ID and password to the address received from the coordinator terminal 3 (i.e., the address of the user terminal 2) as the destination. The user terminal 2 receives the ID and password.

When a user inputs the ID and password (i.e., when a login operation is performed by the user) while the application for plan use is running, the user terminal 2 displays a graphical user interface (GUI) for inputting the user's detailed information and displays the ID in a predetermined mode. Examples of the user's detailed information include, for example, information that the user wants to be provided and the user's preferences such as "The user likes art," but the user's detailed information is not limited to information that the user wants to be provided and the user's preferences.

When the user inputs detailed information, the user terminal 2 transmits the detailed information and the user's ID to the data recording server 1. When the data recording server 1 receives the detailed information and the ID, it adds the detailed information to the already stored set of ID, password, and face authentication data, and stores the ID and password, face authentication data, and detailed information in association. In this case, the data recording server 1 generates a block in the blockchain that includes the ID. In this example embodiment, this block will be the first block of the blockchain corresponding to the user.

Then, a provider terminal capable of transmitting face data (for example, a provider terminal including a camera) transmits the face data of the user to the data recording server 1. For example, when a user checks in to the hotel B, the provider terminal 4B takes a picture of the user's face with a camera installed in the provider terminal 4B according to the operation of the employee of the hotel B, and transmits the face data obtained by shooting and the information indicating the service provider to the data recording server 1. For example, when a user enters the unmanned museum E through the entrance for plan users, a camera in the unmanned museum E takes a picture of the user's face, and the provider terminal 4E may transmit the face data obtained by shooting, information indicating the service provider, information indicating the fact that the user has visited, and the service contents to the data recording server 1.

After generating the first block including the ID, the data recording server 1 allows the generation of the second and subsequent blocks in the blockchain when the face authentication is successful using the face authentication data corresponding to the ID and the face data transmitted as described above.

For example, after the first block including the ID is generated, the user with that ID checks in to the hotel B, and the provider terminal 4B transmits the face data of that user to the data recording server 1 as described above. In this case, the data recording server 1 allows the generation of the second and subsequent blocks when the face authentication is successful using the face authentication data corresponding to the ID included in the first block and the face data.

For example, after the first block including the ID is generated, the user with that ID enters the unmanned museum E, and the provider terminal 4E transmits the face data, information indicating the service provider, information indicating the fact that the user has visited, and service contents to the data recording server 1 as described above. In this case, the data recording server 1 allows the generation of the second and subsequent blocks when the face authentication is successful using the face authentication data corresponding to the ID included in the first block and the face data. Then, the data recording server 1 generates a block which includes information indicating the unmanned museum E, information indicating the fact that the user has visited, service contents, and information indicating that face authentication has been successful as the second block in the user's blockchain, and added it to the blockchain.

After the first block in the blockchain is generated, even if, for example, information indicating the restaurant D, information indicating the fact that the user has visited, service contents, and ID are received from the restaurant D before face authentication is successful, the data recording server 1 will not generate a block including such information. This is because, at this point, the generation of the second and subsequent blocks is not allowed.

After the face data is received from any of the provider terminals 4, and face authenticating is successful using the face authentication data corresponding to the ID included in the first block and the face data, when the ID and service contents are received from the provider terminal 4 that transmits the ID, since the generation of the second and subsequent blocks is allowed, the data recording server 1 generates a block including the service content and the like, and adds the block to the blockchain.

When the conditions for transmitting information for users are satisfied, the data recording server 1 transmits information for users to the user terminal 2. The conditions for transmitting information for users and the information for users are, for example, predetermined.

When the conditions for transmitting information for service providers are satisfied, the data recording server 1 transmits information for service providers to the provider terminal 4 corresponding to the conditions. The conditions for transmitting information for service providers and the information for service providers are predetermined according to the service provider.

Finally, the user performs a procedure for paying a lump-sum fee to the payment base (in this example, the hotel B), and the predetermined service provider distributes the fee to the service providers of each service used by the user.

When the user performs the procedure for paying a lump-sum, the camera on the provider terminal 4B of the payment base (the hotel B) takes a picture of the user's face, and the provider terminal 4B transmits the face data and information that the payment has been completed to the coordinator terminal 3. In addition, the coordinator terminal 3 transmits the face data and the information that the payment has been completed to the data recording server 1.

When the data recording server 1 receives the face data and the information that the payment has been completed, the data recording server 1 performs face authentication using the face data and the face authentication data. When the face authentication is successful, the data recording server 1 deletes the blockchain of the user corresponding to the face authentication data. However, before deleting the blockchain, the data recording server 1 may extract information included in the blockchain and store the extracted data in a storage device. The data in the blockchain cannot be changed. On the other hand, the data extracted from the blockchain can be modified for ease of use and used to create a new plan.

In addition, the data recording server 1 provides information in the blockchain in response to requests from the user terminal 2, coordinator terminal 3, and provider terminals 4B to 4E. However, there are restrictions on the provision of information to the provider terminals 4C to 4E of service providers other than the payment base (the hotel B). Specifically, the data recording server 1 does not provide to the provider terminals 4C to 4E the "service contents" information that indicates the services provided to the user by service provider other than the owner of the provider terminal 4. For example, the data recording server 1 does not transmit information on the service contents (services provided to the user and the price of the service) of the unmanned museum E to the other provider terminal 4. However, the data recording server 1 transmits the service contents collected from each service provider to the provider terminal 4B of the payment base (the hotel B). This is because the payment base receives a lump-sum fee from the user and distributes the fee to the service providers who provided the services to the user.

The information in the blockchain that the data recording server 1 transmits to the user terminal 2 is the information about which service provider the user visited and when the face authentication was successful.

Figure 2:
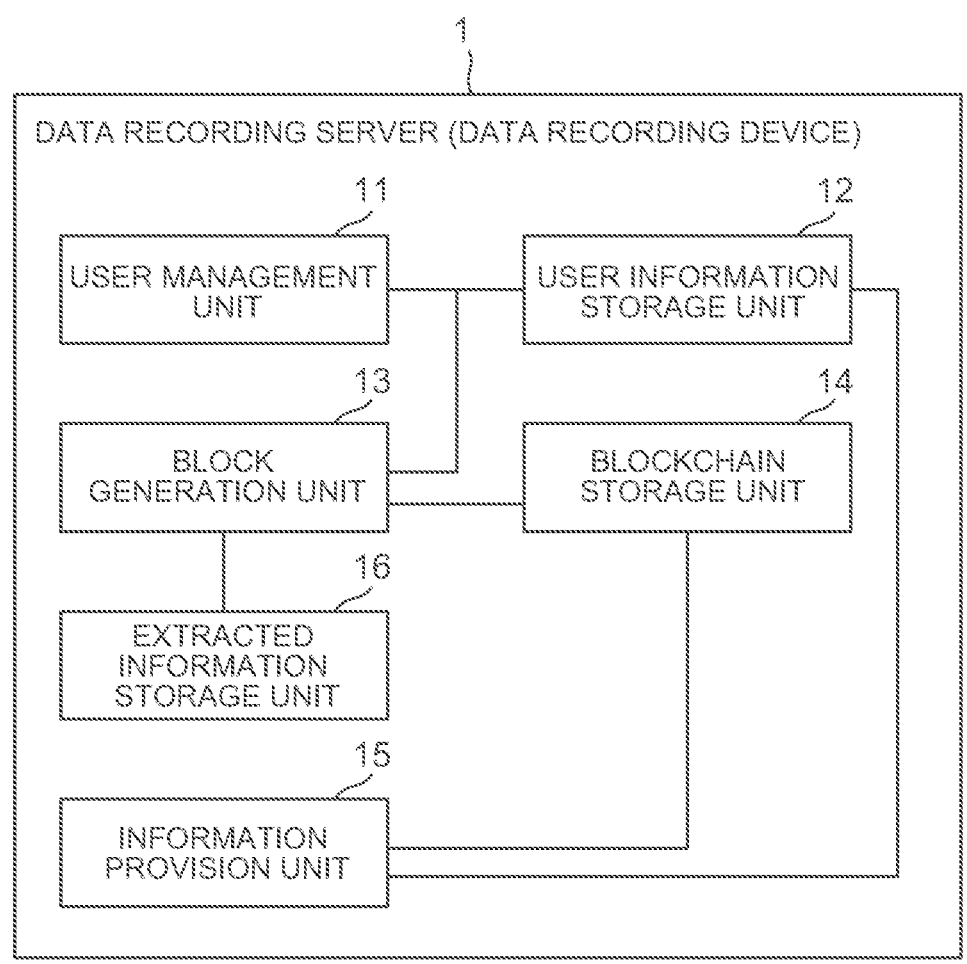
FIG. 2 It depicts a block diagram showing a configuration example of a data recording server of an example embodiment of the present invention.

FIG. 2 is a block diagram showing a configuration example of a data recording server 1 of an example embodiment of the present invention. The data recording server 1 includes a user management unit 11, a user information storage unit 12, a block generation unit 13, a blockchain storage unit 14, an information provision unit 15, and an extracted information storage unit 16.

The user management unit 11 receives information indicating the user's application to the plan for service provision, face data and an address of the user (for example, the e-mail address of the user's user terminal 2) from the coordinator terminal 3. Then, the user management unit 11 generates face authentication data, an ID and a password for that user. Then, the user management unit 11 stores the face authentication data, ID and password in association in the user information storage unit 12. For example, the face data received from the coordinator terminal 3 may be used as the face authentication data, and the facial feature data extracted from the received face data may be used as the face authentication data.

The user information storage unit 12 is a storage device that stores the user's face authentication data, ID and password, etc.

In addition, the user management unit 11 transmits the generated ID and password to the address received from the coordinator terminal 3 (the address of the user terminal 2) as the destination.

Thereafter, the user management unit 11 receives detailed information of the user (for example, the user's preference, etc.) and the ID from the user terminal 2. At this time, the user management unit 11 adds the detailed information to the set of the ID, password and the face authentication data, which are already stored in the user information storage unit 12, and stores the ID and password, the face authentication data, and the detailed information in association in the user information storage unit 1.

The blockchain storage unit 14 is a storage device that stores the blockchain that is generated for each user who has applied to use the plan.

The block generation unit 13 stores a blockchain for each user who has applied to use the plan in the blockchain storage unit 14. Here, the description will be focused on one user. The block generation unit 13 generates a block including the ID of the user as the first block in the blockchain for that user. Upon receiving the information indicating the user's application to the plan for service provision and the face data of the user from the coordinator terminal 3, the user management unit 11 generates the face authentication data, ID and password for the user, and stores the face authentication data, ID and password in association in the user information storage unit 12, and furthermore, transmits the ID and password to the user terminal 2 of the user, and when the ID and detailed information are received from the user terminal 2, the block generation unit 13 generates the first block that includes the ID. However, the timing for generating the first block including the ID is not limited to the above example, and the block generation unit 13 may generate the first block including the ID at any other timing. The block generation unit 13 stores the first block including the ID in the blockchain storage unit 14. The block generation unit 13 also includes information indicating the coordinator in the first block.

After generating the first block including the ID, the block generation unit 13 receives face data from one of the provider terminals 4, and allows the generation of the second and subsequent blocks in the blockchain for the user with the ID when face authentication is successful using the face data and the face authentication data corresponding to the ID.

The block generation unit 13 does not generate the second and subsequent blocks until the second and subsequent blocks are allowed to be generated.

It is assumed that the block generation unit 13 has already allowed the generation of the second and subsequent blocks. Then, it is assumed that the block generation unit 13 receives from the provider terminal 4 information indicating the service provider, information indicating the fact that the user has visited, service contents, and face data, and performs face authentication based on the face authentication data corresponding to the ID included in the first block and the received face data. Then, if the face authentication is successful, the block generation unit 13 generates a new block including the information indicating the service provider, the information indicating the fact that the user has visited, the service contents, and the information indicating that the face authentication was successful, and adds the block to the blockchain.

It is also assumed that the block generation unit 13 has already allowed the generation of the second and subsequent blocks. Then, it is assumed that the block generation unit 13 receives from the provider terminal 4 information indicating the service provider, information indicating the fact that the user has visited, service contents, and ID. In this case, the block generation unit 13 generates a new block indicating the information indicating the service provider, the information indicating the fact that the user has visited, and the service contents, and adds the block to the blockchain. In this way, the block generated by receiving the ID does not include the information indicating that the face authentication was successful.

FIG. 3 is a schematic diagram showing an example of a blockchain generated for a single user. In FIG. 3, one row corresponds to one block. In FIG. 3, the numbers on the left side represent the order in which the blocks were generated.

A block includes service provider information, restricted shared information, shared information, and face authentication information. However, a single block may not include all of these pieces of information.

The service provider information is information that indicates the service provider. The first block includes information indicating the coordinator (travel agency A), not the service provider.

The restricted shared information is information that is restricted to be transmitted to the provider terminal 4, for example, the service contents (services provided to the user and the price of the service). The first block may not include any restricted shared information. The restricted shared information is not provided to the provider terminal 4 of a service provider other than the service provider indicated by the service provider information for the block (excluding payment base). However, the restricted shared information may be provided to the terminals of the service provider indicated by the service provider information of the block, the payment base, the coordinator, and the user.

The shared information is information for which transmission to the provider terminal 4, the coordinator terminal 3, and the user terminal 2 is not restricted. The first block shown in FIG. 3 includes the ID of the user as shared information. The second and subsequent blocks include information indicating the fact that the user with the ID has visited as shared information.

The face authentication information is information indicating that the face authentication has been successful, etc. In the example shown in FIG. 3, the first block includes information that the face authentication data having been generated based on the face data as the face authentication information. The second, fourth, and fifth blocks shown in FIG. 3 include information indicating that the face authentication was successful. As mentioned above, the block generated by receiving the ID does not include any information indicating that the face authentication was successful. For example, the third block shown in FIG. 3 is a block generated by receiving an ID, etc. from the provider terminal 4D. Since face authentication was not performed when this block was generated, this block does not include any information indicating that face authentication was successful (see FIG. 3).

In addition, when the block generation unit 13 receives the face data and the information that the payment has been completed transmitted by the provider terminal 4 of the payment base and relayed by the coordinator terminal 3, the block generation unit 13 performs face authentication using the face data and the face authentication data. When the face authentication is successful, the block generation unit 13 extracts the information included in the blockchain of the user corresponding to the face authentication data, and stores the extracted information in the extracted information storage unit 16. Then, the block generation unit 13 deletes the blockchain. The extracted information storage unit 16 is a storage device that stores the information extracted from the blockchain.

The information provision unit 15 transmits information for users to the user terminal 2 when the conditions for transmitting information for users are satisfied. Examples of these conditions and information for users are shown below. An example of a condition is, for example, that the user's detailed information includes the information "The user likes art" and that the user has visited the restaurant D. As an example of the information for the user corresponding to this condition, a discount coupon for the unmanned museum E can be mentioned. In other words, if the user's detailed information includes the information "The user likes art" and a block indicating that the user has visited the restaurant D is added to the blockchain corresponding to the user, the information provision unit 15 can transmit a discount coupon for the unmanned museum E to the user terminal 2 of the user. When the user terminal 2 receives the discount coupon, the user will know that the fee for using the unmanned museum E will be discounted. The unmanned museum E will allow users to enter the museum through the entrance for plan users, even without presenting the discount coupon. In this case, the provider terminal 4E of the unmanned museum E transmits the service contents including a flat fee and face data to the data recording server 1. When the block generation unit 13 receives this information, the block generation unit 13 performs face authentication using the face data and the face authentication data. When the face authentication is successful, the block generation unit 13 determines whether or not a discount coupon has been transmitted to the user terminal 2 of the user corresponding to the face authentication data, and when the discount coupon has already been transmitted, the block may be generated after the fee included in the service contents is reduced based on the discount coupon.

The above is an example of a condition for transmitting information for users and information for users, and conditions and information for users are not limited to the above example. For example, when a certain condition is satisfied, the information provision unit 15 may transmit an electronic stub or an electronic stamp by which the user can receive a special souvenir or other service when presenting them at a predetermined location, to the user terminal 2 as information for users.

When the condition for transmitting information for service providers is satisfied, the information provision unit 15 transmits information for service providers to the provider terminal 4 corresponding to the condition. For example, as a condition for transmitting information for the souvenir shop C to the provider terminal 4C of the souvenir shop C, it is assumed that the condition that the user with ID has visited the restaurant D is set. As information for the souvenir shop C, it is assumed that the information that "There is a user who has visited the restaurant D" is transmitted. In this case, when a block including the information that the user has visited the restaurant D is generated, the information provision unit 15 may transmit the information "There is a user who has visited the restaurant D" to the provider terminal 4C. In this example, it is assumed that the restaurant D and the souvenir shop C are close to each other. Then, when provider terminal 4C receives the above information, the staff of the souvenir shop C can expect that a user who has visited the restaurant D may visit the souvenir shop C.

The above is example of a condition for transmitting information for service providers and information for service providers, and the condition and information for service providers are not limited to the above example.

The information provision unit 15 may also transmit information included in the blockchain in response to requests from various terminals.

For example, in response to a request from a user terminal 2, the information provision unit 15 may transmit to the user terminal 2 information on which service provider the user visited and when the face authentication was successful. For example, when a request for information provision is received from a user terminal 2 of a user corresponding to the blockchain illustrated in FIG. 3, the information provision unit 15 may transmit to the user terminal 2 information that the face authentication was successful at the hotel B, unmanned museum E, and the hotel B, respectively.

The above is an example of information to be transmitted to the user terminal 2. The information provision unit 15 may transmit other information included in blocks in the blockchain to the user terminal 2.

When there is a request for the information provision from the provider terminal 4, the information provision unit 15 may transmit to the provider terminal 4 in response to the request with respect to service provider information, shared information, and face authentication information. However, with respect to the restricted shared information, the information provision unit 15 transmits the information only to the provider terminal 4 that can be provided the restricted shared information. In other words, the restricted shared information of a block can be provided to the service provider indicated by the service provider information of the block, but not to other service providers. Under this restriction, the information provision unit 15 transmits the restricted shared information to the provider terminal 4. However, when the information provision unit 15 receives a request for information provision from the provider terminal 4 of a service provider that corresponds to the payment base (in this example, the provider terminal 4B shown in FIG. 1), the information included in the blocks in the blockchain may be transmitted to that provider terminal 4 without restriction.

The information provision unit 15 may transmit the information included in the blocks in the blockchain to the coordinator terminal 3 without restriction when there is a request for information provision from the coordinator terminal 3.

The user management unit 11, the block generation unit 13, and the information provision unit 15 are realized by a CPU (Central Processing Unit) of a computer operating according to a data recording program, and a communication interface of the computer. For example, the CPU reads the data recording program from a program recording medium such as a program storage device of the computer, and then operates as the user management unit 11, the block generation unit 13, and the information provision unit 15 using the communication interface, according to the data recording program. The communication interface is an interface to the communication network 10 (see FIG. 1). The user information storage unit 12, the blockchain storage unit 14, and the extracted information storage unit 16 are realized by a storage device provided by the computer, for example.

Figure 4:
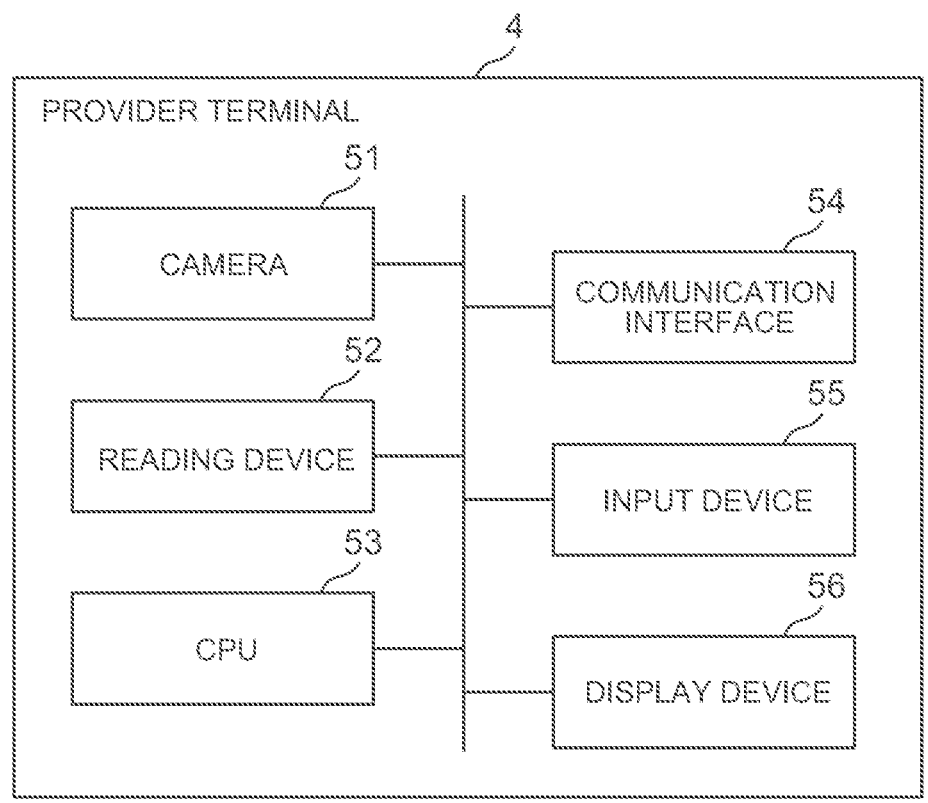
FIG. 4 It depicts a block diagram showing an configuration example of a provider terminal.

FIG. 4 is a block diagram showing a configuration example of a provider terminal 4. In FIG. 4, a camera 51 and a reading device 52 are shown, but the provider terminal 4 may include one of the camera 51 and reading device 52. However, the provider terminal 4 of the service provider that serves as the payment base includes the camera 51. The provider terminal 4 includes a CPU 53, a communication interface 54, an input device 55, and a display device 56.

The camera 51 takes a picture of the user's face and generates the user's face data. The camera 51 may be installed outside the provider terminal 4, and the camera 51 may be connected to the provider terminal 4. The camera 51 is installed separately from the provider terminal 4, and for example, the operator may input the face data generated by the camera 51 into the provider terminal 4.

The reading device 52 is a device that reads the user's ID displayed on the user terminal 2 (see FIG. 1). For example, when the ID is displayed in the form of a two-dimensional barcode, the reading device 52 is a device that can read the ID displayed in the form of a two-dimensional barcode. In addition, the reading device 52 may be installed outside the provider terminal 4, and the reading device 52 and the provider terminal 4 may be connected to each other.

The communication interface 54 is an interface to the communication network 10 (see FIG. 1).

The input device 55 receives information input from the operator operating the provider terminal 4.

The CPU 53, for example, reads the program for the provider terminal recorded on the program recording medium (not shown) and operates according to the program.

When the camera 51 generates the face data of the user by shooting and the service contents are input via the input device 55, the CPU 53 transmits the face data, the information indicating the service provider which owns the provider terminal 4, the information indicating the fact that the user has visited, and the service contents to the data recording server 1 through the communication interface 54. The CPU 53 may store information indicating the service provider in advance.

In addition, when the CPU 53 receives information included in a block in the blockchain from the data recording server 1, it displays the information the display device 56 display.

Next, the configuration of the coordinator terminal 3 will be described. Since the configuration of the coordinator terminal 3 is similar to that of the provider terminal 4, it is described with reference to FIG. 4. However, the coordinator terminal 3 may not have a reading device 52 of the ID.

For example, the CPU 53 of the coordinator terminal 3 reads the program for the coordinator terminal recorded in the program storage medium (not shown) and operates according to the program.

When the camera 51 generates the face data of a user by shooting, and the information indicating the user's application to the plan for service provision and the address of the user terminal 2 are input via the input device 55, the CPU 53 transmits the face data, the information indicating the user's application to the plan for service provision, and the address of the user terminal 2 to the data recording server 1 through the communication interface 54.

When the CPU 53 receives the face data and the information that the payment has been completed from the provider terminal 4 of the payment base, the CPU 53 transmits those information to the data recording server 1 through the communication interface 54.

In addition, when the CPU 53 receives information included in a block in the blockchain from the data recording server 1, the CPU 53 displays that information the display device 56.

Figure 5:
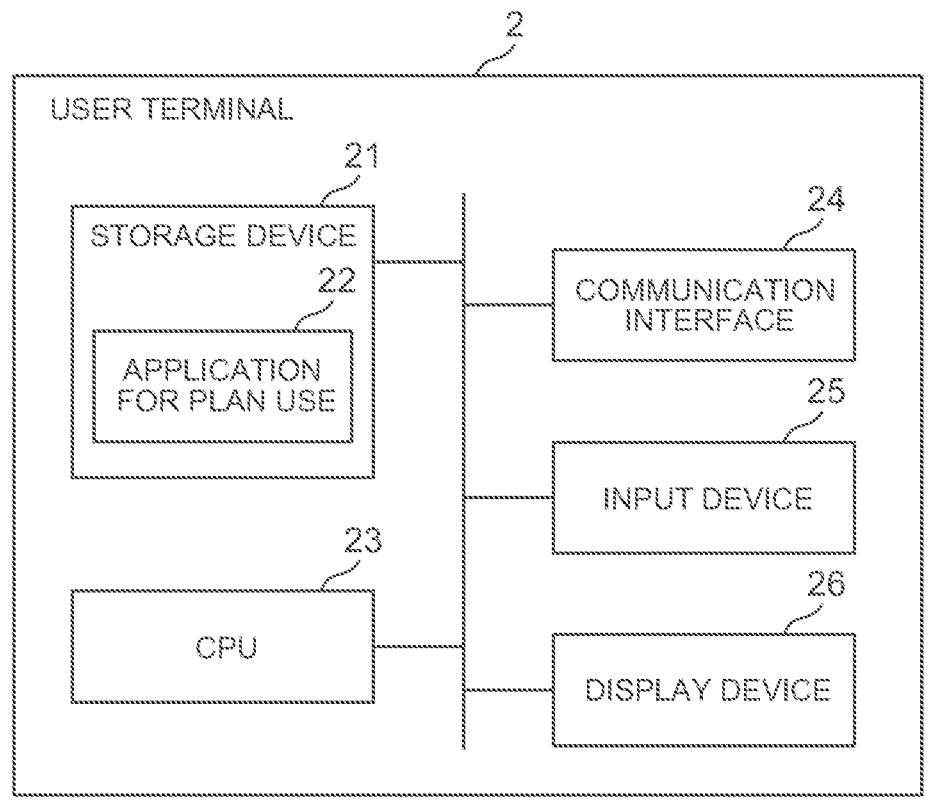
FIG. 5 It depicts a block diagram showing an configuration example of a user terminal.

FIG. 5 is a block diagram showing a configuration example of a user terminal 2. The user terminal 2 is realized by a portable terminal such as a smartphone. The user terminal 2 includes a storage device 21, a CPU 23, a communication interface 24, an input device 25, and a display device 26.

The communication interface 24 is an interface to the communication network 10 (see FIG. 1).

The input device 25 receives information input from the user.

The storage device 21 stores an application for plan use 22 in advance. The CPU 23 reads the application for plan use 22 and operates according to the application for plan use 22.

When the CPU 23 receives the user's ID and password from the data recording server 1 by e-mail, for example, the CPU 23 displays the ID and password on the display device 26.

In addition, when the ID and password are input by the user and the login is successful while the application for plan use is running, the CPU 23 displays an input GUI of detailed information on the display device 26, or displays the ID in the form of a two-dimensional barcode on the display device 26, for example. When the detailed information is input from the user to the input GUI of the detailed information via the input device 25, the CPU 23 transmits the detailed information and the ID to the data recording server 1 through the communication interface 24.

The ID displayed on the display device 26 is read by the provider terminal 4 of the service provider visited by the user.

When the CPU 23 receives information for the user, such as an electronic coupon, from the data recording server 1, the CPU 23 displays the information for the user on the display device 26.

In addition, the CPU 23 can, for example, request information to the data recording server 1 about which service provider the user visited and when the face authentication was successful, and when the information is received from the data recording server 1, the CPU 23 displays the information on the display device 26.

Figure 6:
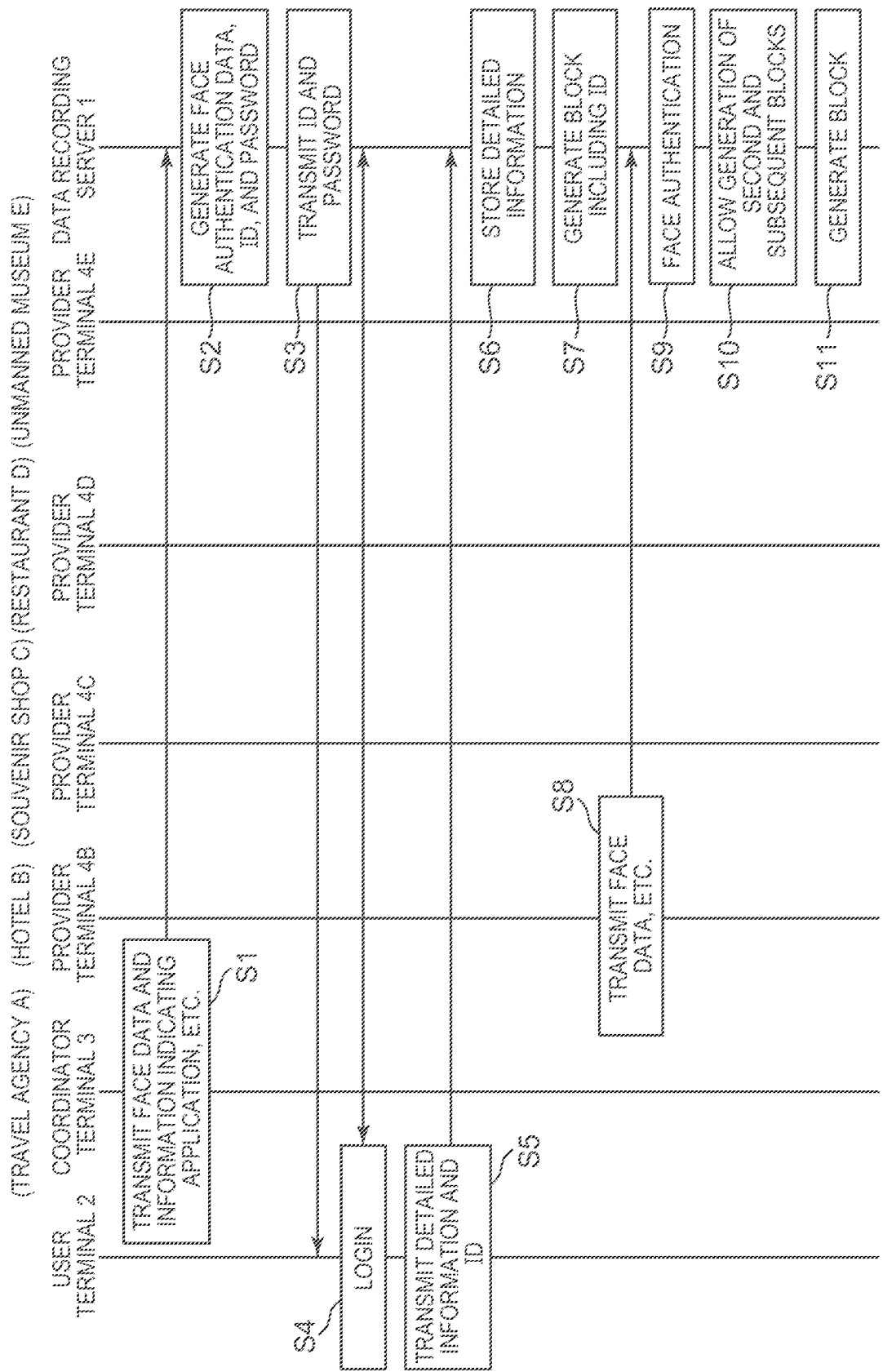
FIG. 6 It depicts a sequence diagram showing an example of the processing process of an example embodiment of the present invention.
Figure 7:
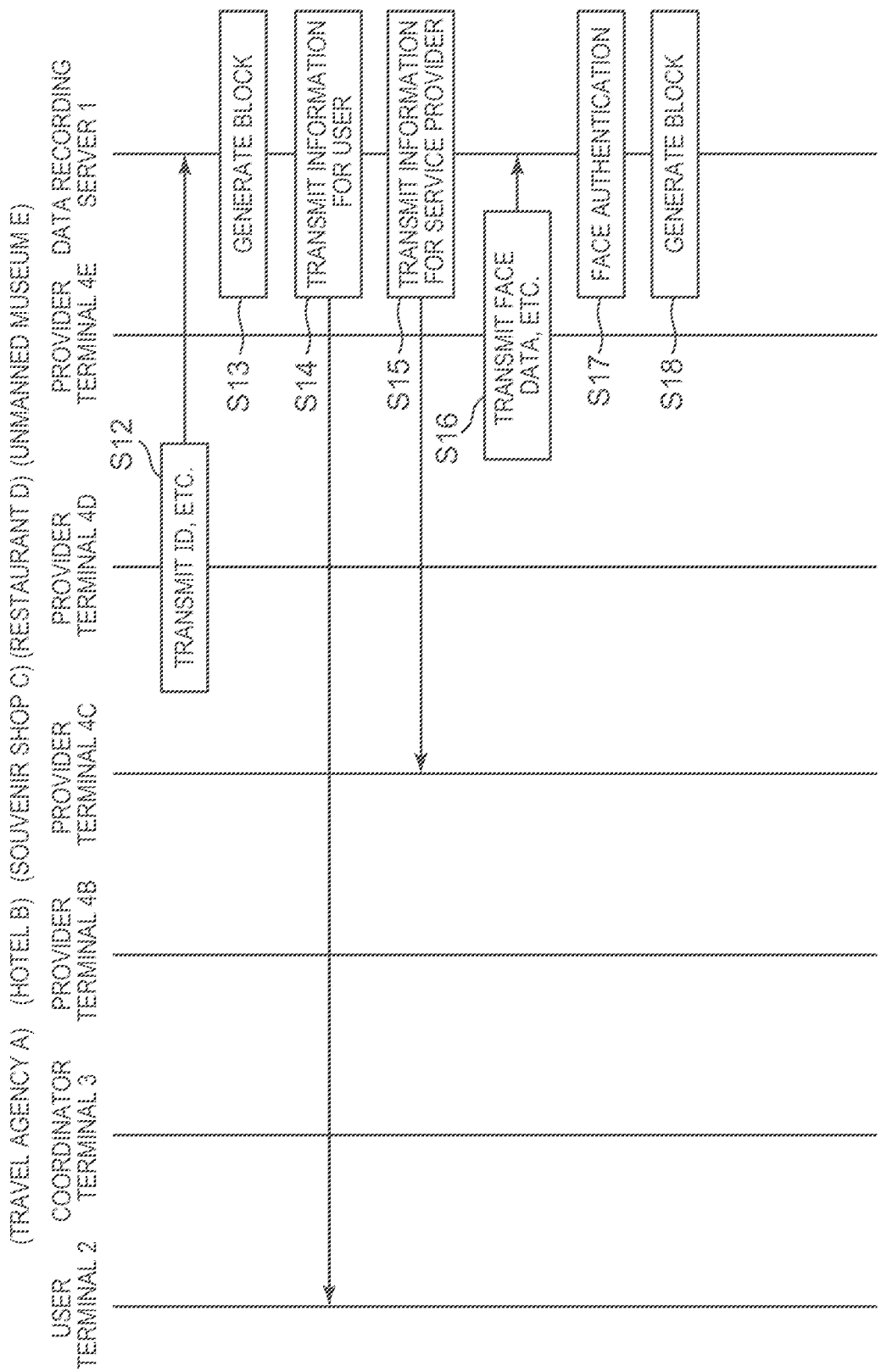
FIG. 7 It depicts a sequence diagram showing an example of the processing process of an example embodiment of the present invention.
Figure 8:
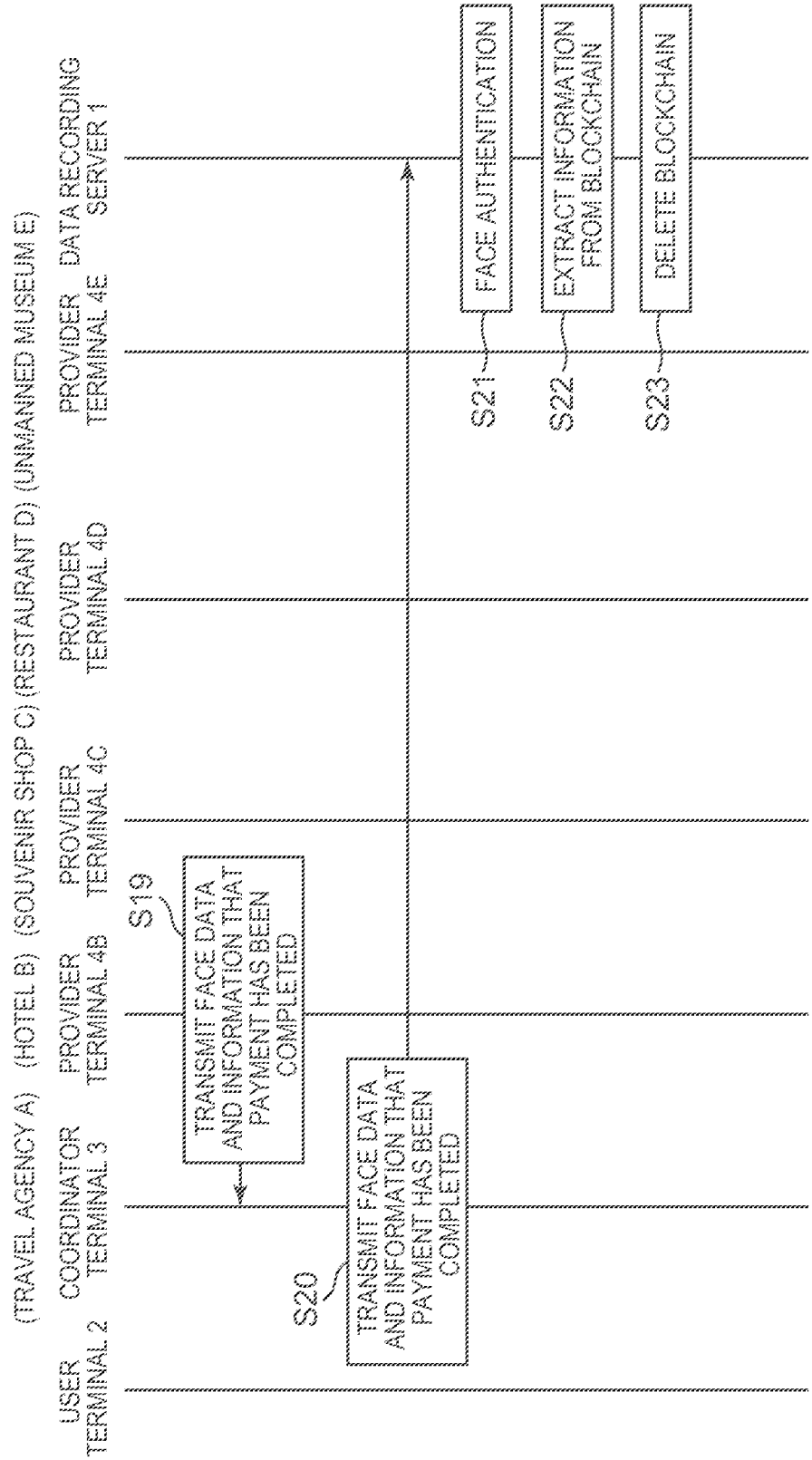
FIG. 8 It depicts a sequence diagram showing an example of the processing process of an example embodiment of the present invention.

FIG. 6, FIG. 7 and FIG. 8 are sequence diagrams showing an example of the processing process of this example embodiment of the present invention. It is assumed that a user comes to a store of the travel agency A to apply for a plan use about a travel. In this case, the coordinator terminal 3 takes a picture of the user's face with a camera according to the operator's operation, and generates face data. In addition, the information indicating the user's application for the plan and the address of the user terminal 2 are input to the coordinator terminal 3. The coordinator terminal 3 transmits the face data, the information indicating the user's application for the plan, and the address to the data recording server 1 (step S1).

When the user management unit 11 of the data recording server 1 receives the information transmitted in step S1, the user management unit 11 generates the face authentication data, ID, and password for the user, and stores the face authentication data, ID and password in association in the user information storage unit 12 (step S2). As described above, the received face data itself may be used as the face authentication data, or the facial feature data extracted from the received face data may be used as the face authentication data. Alternatively, other types of face authentication data may be generated.

Next, the user management unit 11 transmits the ID and password to the address received in step S1 as the destination (step S3). In other words, the user management unit 11 transmits the user's ID and password to the user terminal 2.

The user terminal 2 displays the received ID and password, and the user recognizes the ID and password. Then, the ID and password are input to the user terminal 2 by the user while the application for the plan use is running. Then, a login process is performed with the data recording server 1 (step S4).

After login, the user terminal 2 displays an input GUI of the user's detailed information. When the user's detailed information (for example, the user's preferences, etc.) is input via the input GUI, the user terminal 2 transmits the detailed information and the user's ID to the data recording server 1 (step S5).

When the user management unit 11 of the data recording server 1 receives the detailed information and ID, the user management unit 11 adds the detailed information to the set of the face authentication data, ID, and password already stored in the user information storage unit 12, and stores the face authentication data, ID and password, and detailed information in association in the user information storage unit 12 (step S6).

Next, the block generation unit 13 generates a block including the ID as the first block in the blockchain corresponding to the user (step S7). The block generation unit 13 also includes information indicating the coordinator (travel agency A) and information that face authentication data has been generated in the block. Then, the block generation unit 13 stores the block in the blockchain storage unit 14. As a result, for example, the first block shown in FIG. 3 is stored.

When traveling, it is assumed that the user first goes to the hotel B and receives a service at the hotel B. In this case, the provider terminal 4B takes a picture of the user's face with a camera according to the operation of an employee of the hotel B, for example, and generates face data.

Then, the provider terminal 4B transmits the information indicating the service provider (information indicating the hotel B), the information indicating the fact that the user has visited, the service contents, and the face data to the data recording server 1 (step S8). The service contents may be input into the provider terminal 4B by an employee, for example.

The block generation unit 13 receives the information transmitted in step S8. The block generation unit 13 performs face authentication using the face authentication data stored in the user information storage unit 12 and the received face data. Here, the block generation unit 13 succeeds in face authentication of the received face data based on the face authentication data corresponding to the ID included in the block (the first block) generated in step S7 (step S9). Then, the block generation unit 13 allows the generation of the second and subsequent blocks in the blockchain corresponding to the ID (step S10). Then, the block generation unit 13 generates a block including the information received from the provider terminal 4B in step S8, and stores the block in the blockchain storage unit 14 as a new block (second block) in the blockchain (step S11).

Next, it is assumed that a traveler goes to the restaurant D and receives service at the restaurant D. At this time, the user holds the ID displayed on the user terminal 2 over the reading device installed in the provider terminal 4D, and the reading device reads the ID. Then, the provider terminal 4D transmits the information indicating the service provider (information indicating restaurant D), information indicating the fact that the user has visited, service contents, and ID to the data recording server 1 (step S12, see FIG. 7). The service contents can be input into the provider terminal 4D by an employee of the restaurant D, for example.

The block generation unit 13 receives the information transmitted in step S12. Then, the block generation unit 13 generates a block including the information received from the provider terminal 4D in step S12, and stores the block in the blockchain storage unit 14 as a new block (third block) in the blockchain corresponding to the received ID (step S13).

Here, it is assumed that the condition that the detailed information of the user includes the information "The user likes art" and that the user has visited the restaurant D is predetermined as a condition for transmitting information for users. Further, it is assumed that a discount coupon for the unmanned museum E is predetermined as information for users to be transmitted when this condition is satisfied. In addition, it is assumed that the detailed information of the user of interest includes the information "The user likes art". In this case, the information provision unit 15 of the data recording server 1 determines that the above condition is satisfied when the step S13 is completed, and transmits a discount coupon for the unmanned museum E to the user terminal 2 of the user of interest as information for the user (step S14).

Further, it is assumed that the condition that the user with the ID has visited the restaurant D is predetermined as a condition for transmitting the information for the souvenir shop C to the provider terminal 4C of the souvenir shop C. Then, it is assumed that the information that "there is a user who has visited the restaurant D" is predetermined as the information for the service provider that is transmitted to the souvenir shop C when this condition is satisfied. In this case, the information provision unit 15 determines that the above condition is satisfied when the step S13 is completed, and transmits the information that "there is a user who has visited the restaurant D" to the provider terminal 4C as information for the service provider (step S15).

Next, it is assumed that the user enters the unmanned museum E. In the unmanned museum E, a camera of the provider terminal 4E and a sensor are installed at the entrance for the plan user, and when the sensor detects the user, the camera takes a picture of the face of the user and generates face data. In this case, the provider terminal 4E transmits the information indicating the service provider (information indicating the unmanned museum E), the information indicating the fact that the user has visited, the service contents, and the face data to the data recording server 1 (step S16). The service contents to be transmitted by the provider terminal 4E are fixedly defined, and the provider terminal 4E may store the service contents in a memory or the like.

The block generation unit 13 receives the information transmitted in step S16. The block generation unit 13 performs face authentication using the face authentication data stored in the user information storage unit 12 and the received face data. Here, the block generation unit 13 successfully authenticates of the received face data based the face authentication data corresponding to the ID included in the block (the first block) generated in step S7 (step S17). Then, the block generation unit 13 generates a block including the information received from the provider terminal 4E in step S16. At this time, since a discount coupon for the unmanned museum E is transmitted to the user terminal 2 of the user corresponding to the face authentication data, the block generation unit 13 generates a block after reducing the fee included in the service contents based on the discount coupon. Then, the block generation unit 13 stores the block in the blockchain storage unit 14 as a new block (the fourth block) in the blockchain corresponding to the face authentication data (step S18). However, the method of generating a block including a reduced fee based on a discount coupon is not limited to the above example.

Therefore, in the same way, when the user receives a service from a service provider, the provider terminal 4 transmits face data or ID and service contents, etc., and when the block generation unit 13 receives such information, a block including the service contents and the like is added to the blockchain.

Further, it is assumed that the user finally completes the procedure for lump-sum payment of the fees of the services provided so far at the payment base (the hotel B in this example). In this case, for example, the provider terminal 4B takes a picture of the user's face with a camera according to the operation of an employee of the hotel B, and generates face data. In addition, information that the payment has been completed is input to the provider terminal 4B by the employee. Then, the provider terminal 4B of the payment base transmits the face data and the information that the payment has been completed to the coordinator terminal 3 (step S19, see FIG. 8). The payment base (the hotel B) that receives the lump-sum payment distributes the fee to each service provider.

In addition, the coordinator terminal 3 receives the face data and the information that the payment has been completed, transmitted in step S19. The plan coordinator (travel agency A) confirms that the user has paid the fee by referring to the information that the payment has been completed. Then, the coordinator terminal 3 transmits the face data and the information that the payment has been completed, received from the payment base, to the data recording server 1, for example, according to the operation of an employee of the travel agency A (step S20).

The block generation unit 13 of the data recording server 1 receives the face data and the information that the payment has been completed. Then, the block generation unit 13 performs face authentication using the received face data and the face authentication data stored in the user information storage unit 12. Here, the block generation unit 13 successfully authenticates the received face data based on the face authentication data corresponding to the ID included in the block (the first block) generated in step S7 (step S21). Then, the block generation unit 13 extracts the information included in each block in the blockchain corresponding to the ID, and stores the extracted information in the extracted information storage unit 16 (step S22). Then, the block generation unit 13 deletes the blockchain from the blockchain storage unit 14 (step S23).

According to the present example embodiment, when a user receives a service from a service provider, the provider terminal 4 transmits face data or ID, and service contents, etc., and the block generation unit 13 receives such information, a block including the service contents, etc. is added to the blockchain. The blocks in the blockchain include information indicating the service provider, the service contents, and the information indicating the fact that the user has visited, etc., and the information indicating that the face authentication has been successful may also be included in the blocks. Therefore, by confirming the information included in the blocks in the blockchain, it is possible to accurately grasp a trend of the user receiving service provision. Then, by analyzing the trends of users grasped by the information, it is possible to create a better plan for users and service providers.

In the above example embodiment, after a user pays a lump-sum of the fees of the services at a payment base, the blockchain corresponding to the user is deleted. However, before deleting the blockchain, the block generation unit 13 extracts the information included in each block in the blockchain and stores the extracted information in the extracted information storage unit 16. Therefore, even after the blockchain has been deleted, it is possible to accurately grasp a trend of a user based on the information stored in the extracted information storage unit 16. In addition, the data extracted from each block in the blockchain can be modified for ease of use and used to create a new plan.

The data extracted from each block in the blockchain can also be used for various marketing analyses.

In addition, the information provision unit 15 transmits information for users to the user terminal 2 when the condition for transmitting information for users is satisfied. For example, the aforementioned discount coupons, electronic stubs, electronic stamps, etc. can be used as this information for users. Therefore, users who obtain the information for users will have an incentive to receive services from various service providers. As a result, the local economy can be revitalized.

In the above example embodiment, the description is based on the example of a case where each user applies to use a plan alone. Next, the case where multiple users apply to use the plan as a group will be described. An example of a group is, for example, a family, but a group is not limited to a family.

In this case, each user belonging to the group goes to the store of the travel agency A together. Then, the coordinator terminal 3 takes a picture of the face of each user belonging to the group with a camera, and generates face data for each user. In addition, the address of each user's user terminal 2 is input to the coordinator terminal 3. Then, in step S1, the coordinator terminal 3 transmits the face data of each user belonging to the group, the information indicating the application to the plan, and the address of the user terminal 2 of each user to the data recording server 1.

When the user management unit 11 of the data recording server 1 receives such information, the user management unit 11 generates face authentication data for each face data in step S2. In addition, the user management unit 11 generates one ID and password for the group. Then, the user management unit 11 stores the plurality of face authentication data and one ID and password in association in the user information storage unit 12.

In addition, in step S3, the user management unit 11 transmits a common ID and password to each user's user terminal 2, respectively. The operation from step S4 onward is the same as in the aforementioned example embodiment. Note that steps S4 and S5 may be performed at each user terminal 2. In this case, the block generation unit 13 generates one blockchain for the group. In addition, the block generation unit 13 may allow the generation of the second and subsequent blocks in the blockchain if the face authentication of any one person belonging to the group is successful.

In this example, face authentication data of each user belonging to the group, the ID and password commonly used in the group in association are stored in the user information storage unit 12. As a result, whether each user belonging to the group acts together to receive the service or each of those users acts alone to receive the service, the block including the service contents is added to the blockchain corresponding to the group.

In the above example, the case where one blockchain is generated for a group has been described as an example, but a blockchain may be generated for each user who belongs to the group. In this case, the coordinator terminal 3 also transmits, in step S1, information indicating a representative who performs the procedure for the lump-sum payment of the fees of the services to the data recording server 1. Then, the user management unit 11 generates face authentication data, as well as ID and password, for each user in the group, and stores, for each user, the face authentication data, the ID and password in association in the user information storage unit 12. Furthermore, the user management unit 11 defines each ID corresponding to each user belonging to a group as a group. Each operation from step S3 onward is the same as in the above example embodiment, and each operation from step S3 onward is performed for each user with an individual ID. As a result, a blockchain is generated for each user belonging to the group.

However, in this case, when the representative performs the procedure for the lump-sum payment of fees, the procedure for the lump-sum payment of fees for all users is performed based on the service contents included in the respective blockchains of each user belonging to the same group as the representative. When deleting a blockchain, each blockchain corresponding to each user belonging to the group is deleted.

Figure 9:
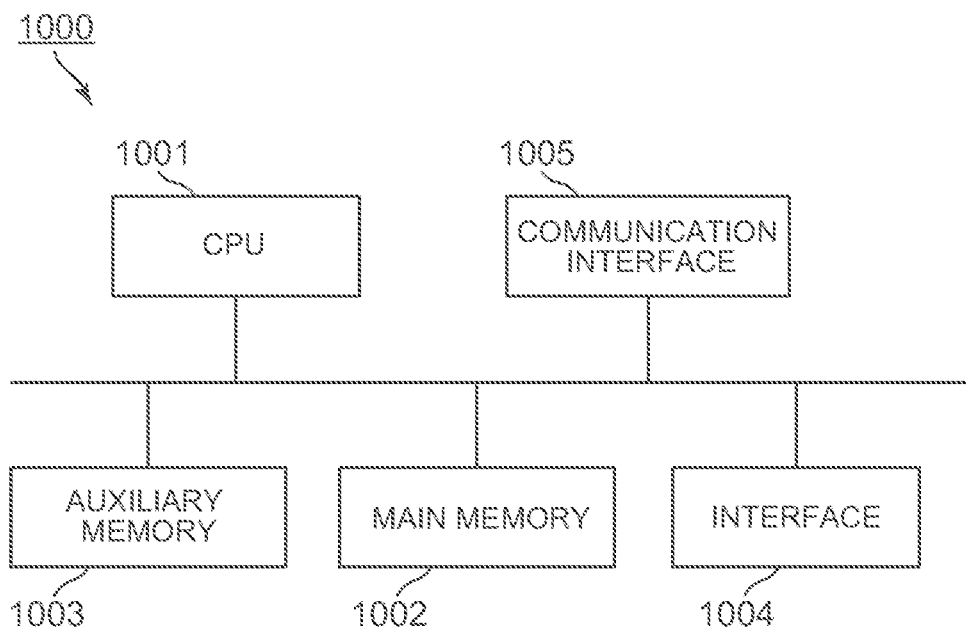
FIG. 9 It depicts a schematic block diagram showing a computer configuration example for a data recording server of an example embodiment of the present invention.

FIG. 9 is a schematic block diagram showing a computer configuration example for a data recording server 1 (data recording device 1) of the example embodiment of the present invention. The computer 1000 includes a CPU 1001, a main memory 1002, an auxiliary memory 1003, an interface 1004, and a communication interface 1005.

The data recording server 1 (data recording device 1) of the example embodiment of the present invention is realized by the computer 1000. The operation of the data recording server 1 is stored in the auxiliary memory 1003 in the form of a data recording program. The CPU 1001 reads the data recording program from the auxiliary memory 1003, expands it to the main memory 1002, and executes the processes described in the above example embodiment according to the data recording program.

The auxiliary memory 1003 is an example of a non-transitory tangible medium. Other examples of non-transitory tangible media are magnetic disk, optical magnetic disk, CD-ROM (Compact Disk Read Only Memory), DVD-ROM (Digital Versatile Disk Read Only Memory), semiconductor memory, etc. In addition, when the program is delivered to the computer 1000 through a communication line, the computer 1000 that receives the delivery may expand the program into the main memory 1002 and execute the processes described in the above example embodiments according to the program.

Some or all of the components may be realized by a general-purpose or dedicated circuitry, processors, or a combination of these. They may be configured by a single chip or by multiple chips connected through a bus. Some or all of each component may be realized by a combination of the above-mentioned circuitry, etc. and programs.

When some or all of each component is realized by multiple information processing devices, circuits, etc., the multiple information processing devices, circuits, etc. may be centrally located or distributed. For example, the information processing devices, circuits, etc. may be implemented as a client-and-server system, a cloud computing system, etc., each of which is connected through a communication network.

Figure 10:
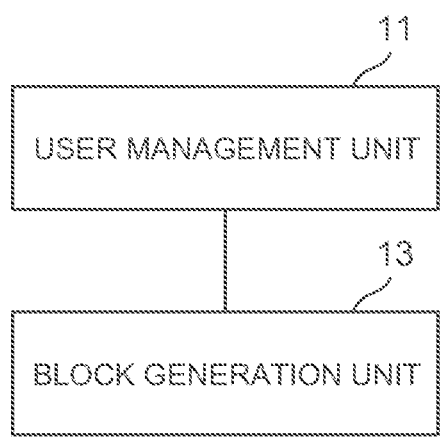
FIG. 10 It depicts a block diagram showing an overview of the data recording device of the present invention.

Next, an overview of the present invention will be explained. FIG. 10 is a block diagram showing an overview of the data recording device of the present invention. The data recording device of the present invention comprises a user management unit 11 and a block generation unit 13.

The user management unit 11 generates an ID and a password of a user when information indicating application of the user for a plan related to service provision, and face data of the user are received from a predetermined terminal (for example, coordinator terminal 3), transmits the ID and the password to a terminal of the user, and stores face authentication data based on the face data and the ID in association in a storage device (for example, user information storage unit 12).

The block generation unit 13 generates, in a predetermined case, a block including the ID in a blockchain.

The block generation unit 13 generates a new block including information indicating a service provider and service contents, when the face data of the user and the service contents are received from a terminal of the service provider and face authentication is successful based on the face data and the face authentication data, or when the ID of the user and the service contents are received from the terminal of the service provider, and adds the new block to the blockchain.

With such a configuration, it is possible to accurately grasp a trend of a user receiving service provision.

In addition, an information provision unit (for example, information provision unit 15) may transmit information for the user to the terminal of the user when a condition for transmitting the information for the user is satisfied.

The information provision unit may transmit information for the service provider to the terminal of the service provider when a condition for transmitting the information for the service provider is satisfied.

The block generation unit 13 may generate the new block including information that the face authentication is successful along with the information indicating the service provider and the service contents, when the face data of the user and the service contents are received from the terminal of the service provider and the face authentication is successful based on the face data and the face authentication data, and add the new block to the blockchain, and the information provision unit may transmit information included in the block in the blockchain to the terminal of the user in response to a request from the terminal of the user.

While the present invention has been explained with reference to the example embodiments, the present invention is not limited to the aforementioned example embodiments. Various changes understandable to those skilled in the art within the scope of the present invention can be made to the structures and details of the present invention.

This application is based upon and claims the benefit of priority from Japanese patent application No. 2019-189562, filed on Oct. 16, 2019, the disclosure of which is incorporated herein in its entirety by reference.

INDUSTRIAL APPLICABILITY

The present invention is suitably applied to a data recording device that record a trend of a user receiving service provision

REFERENCE SIGNS LIST

1 Data recording server (data recording device)
2 User terminal
3 Coordinator terminal
4 Provider terminal
11 User management unit
12 User information storage unit
13 Block generation unit
14 Blockchain storage unit
15 Information provision unit
16 Extracted information storage unit

What is claimed is:
1. A data recording device comprising:
a memory configured to store instructions; and
a processor configured to execute the instructions to control the data recording device to:
generate an ID and a password of a user, when receiving from a predetermined terminal, (i) information indicating application of the user for a plan related to a service provision, and (ii) face data of the user, transmit the ID and the password to a terminal of the user, and store face authentication data based on the face data and the ID in association in a storage device, generate, in a predetermined case, a block including the ID in a blockchain, generate a new block including information indicating a service provider and service contents, when the face data of the user and the service contents are received from a terminal of the service provider and face authentication is successful based on the face data and the face authentication data, or when the ID of the user and the service contents are received from the terminal of the service provider, and add the new block to the blockchain.

2. The data recording device according to claim 1, wherein the processor further controls the data recording device to transmit information for the user to the terminal of the user when a condition for transmitting the information for the user is satisfied.

3. The data recording device according to claim 2, wherein the processor further controls the data recording device to transmit information for the service provider to the terminal of the service provider when a condition for transmitting the information for the service provider is satisfied.

4. The data recording device according to claim 2, wherein, the processor further controls the data recording device to generate the new block including information that the face authentication is successful along with the information indicating the service provider and the service contents, when the face data of the user and the service contents are received from the terminal of the service provider and the face authentication is successful based on the face data and the face authentication data, and adds the new block to the blockchain, and wherein the processor further controls the data recording device to transmit information included in the block in the blockchain to the terminal of the user in response to a request from the terminal of the user.

5. A data recording method implemented by a computer, comprising:

generating an ID and a password of a user, when receiving from a predetermined terminal, (i) information indicating application of the user for a plan related to service provision, and (ii) face data of the user, transmitting the ID and the password to a terminal of the user, and storing face authentication data based on the face data and the ID in association in a storage device, generating, in a predetermined case, a block including the ID in a blockchain, and generating a new block including information indicating a service provider and service contents, when the face data of the user and the service contents are received from a terminal of the service provider and face authentication is successful based on the face data and the face authentication data, or when the ID of the user and the service contents are received from the terminal of the service provider, and adding the new block to the blockchain.

6. A non-transitory computer readable recording medium in which a data recording program is recorded, the data recording program causing a computer to execute:

a user management process of generating an ID and a password of a user, when receiving from a predetermined terminal, (i) information indicating application of the user for a plan related to service provision, and (ii) face data of the user, transmitting the ID and the password to a terminal of the user, and storing face authentication data based on the face data and the ID in association in a storage device, a block generation process of generating, in a predetermined case, a block including the ID in a blockchain, and a block addition process of generating a new block including information indicating a service provider and service contents, when the face data of the user and the service contents are received from a terminal of the service provider and face authentication is successful based on the face data and the face authentication data, or when the ID of the user and the service contents are received from the terminal of the service provider, and adding the new block to the blockchain.

7. The data recording method according to claim 5, further comprising:

transmitting information for the user to the terminal of the user when a condition for transmitting the information for the user is satisfied.

8. The data recording method according to claim 7, further comprising:

transmitting information for the service provider to the terminal of the service provider when a condition for transmitting the information for the service provider is satisfied.

9. The data recording method according to claim 7, further comprising:

generating the new block including information that the face authentication is successful along with the information indicating the service provider and the service contents, when the face data of the user and the service contents are received from the terminal of the service provider and the face authentication is successful based on the face data and the face authentication data, and adding the new block to the blockchain, and transmitting information included in the block in the blockchain to the terminal of the user in response to a request from the terminal of the user.

* * * * *